Aug. 30, 1932.  A. H. ALEXANDER  1,873,990
BODY FOR MOTOR VEHICLES
Filed Jan. 15, 1927  4 Sheets-Sheet 1
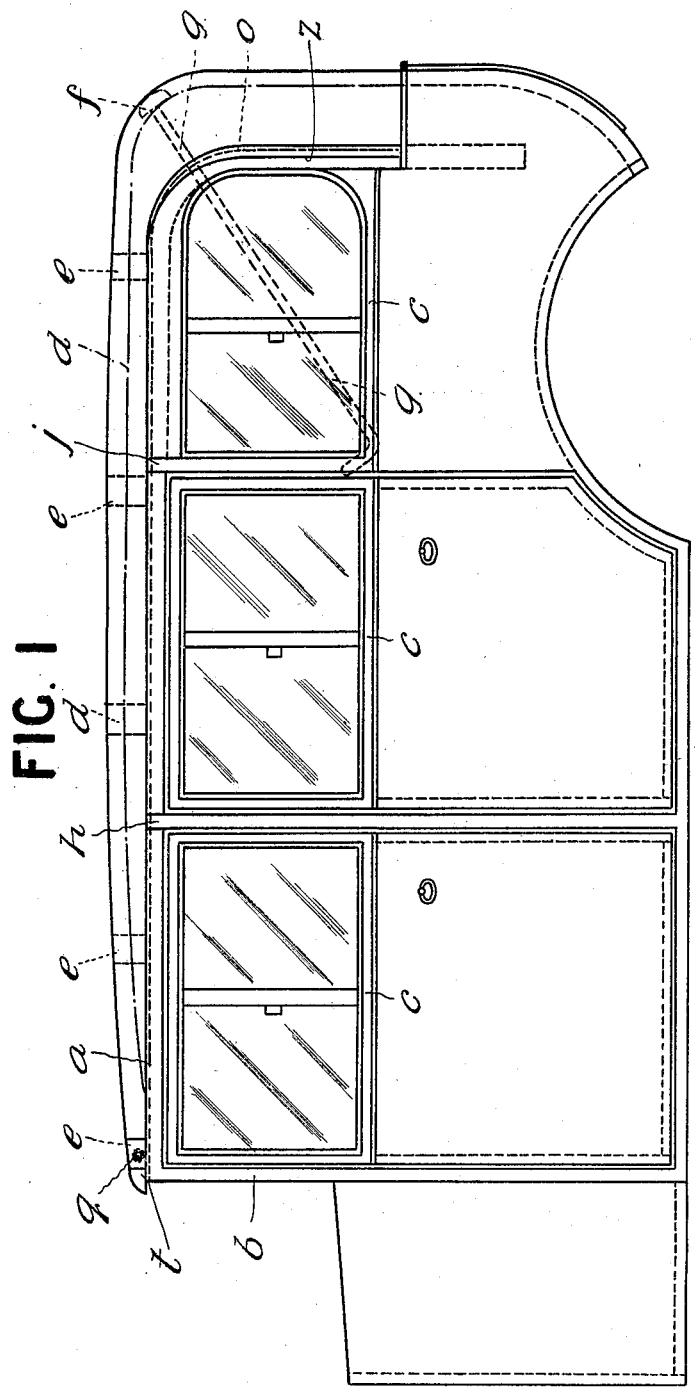
Inventor:
Alfred Hope Alexander
by Andrew Wilson
Attorney

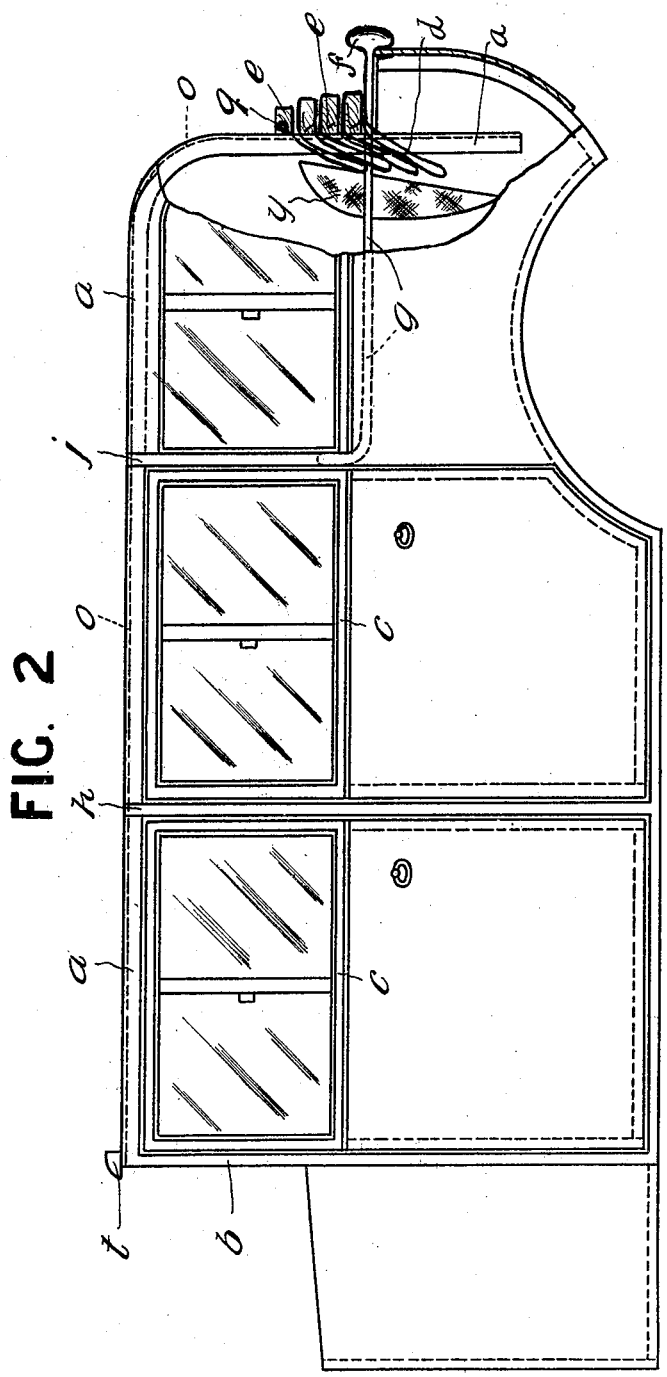

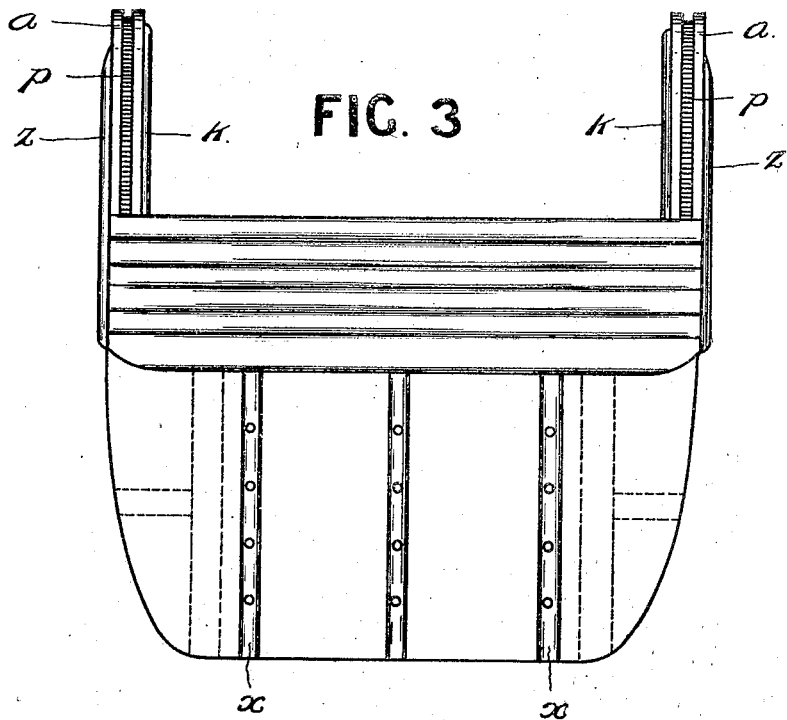
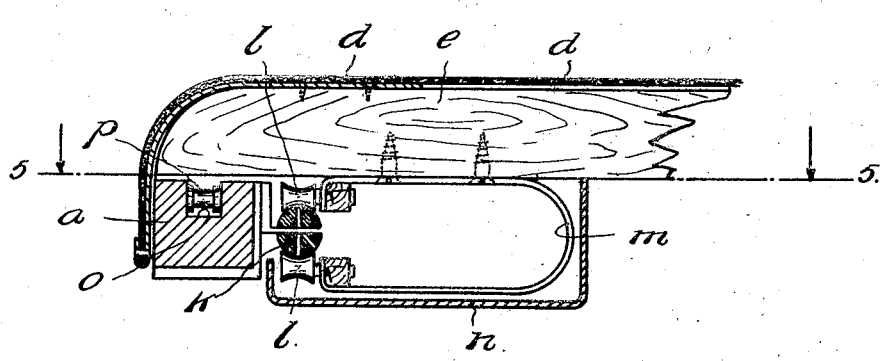

Aug. 30, 1932.  A. H. ALEXANDER  1,873,990
BODY FOR MOTOR VEHICLES
Filed Jan. 15, 1927  4 Sheets-Sheet 4

Patented Aug. 30, 1932

1,873,990

UNITED STATES PATENT OFFICE

ALFRED HOPE ALEXANDER, OF EDINBURGH, SCOTLAND, ASSIGNOR TO SUNSALOON BODIES LIMITED, OF EDINBURGH, SCOTLAND, A COMPANY OF SCOTLAND

BODY FOR MOTOR VEHICLES

Application filed January 15, 1927, Serial No. 161,262, and in Great Britain March 20, 1926.

This invention relates to improvements in bodies for motor vehicles.

One of the greatest problems in connection with vehicle bodies is to provide a satisfactory body which can be used at will either as an open or closed body.

Permanently closed bodies of the saloon type have recently been coming into favour more, but in good weather a closed body is not so pleasant to travel in as an open body, either from a health or sight-seeing point of view. Nevertheless, many people buy permanently closed bodies owing to the fact that the usual hood provided with an open body fails to give adequate protection against rain and wind in very bad weather, and takes an appreciable time to erect as well as involving dismounting from the vehicle.

The object of my invention is to provide an improved form of body which is free from these disadvantages, and can be very rapidly converted from an open body to a closed body or vice versa, and which when closed is water-tight and draught proof.

My invention comprises a vehicle body in which a flexible roof is carried by cross-members adapted to travel in or upon longitudinal members or cantrails, and a transverse shaft or spindle, mounted preferably on the front cross-member of the roof structure, has toothed wheels meshing with racks or equivalent devices fitted in or upon the cantrails, so that rotation of the shaft or spindle will cause the roof and its cross-members to travel along the cantrails which are preferably curved downwardly at their rear ends to meet the back of the vehicle body.

In the open position the roof with its cross-members is folded down over the back of the car in a somewhat similar way to an ordinary cape-cart hood, and the folded fabric of the roof may if desired be received in a recess behind the back cushion of the rear seat to give a very neat appearance. When it is desired to close the body the front cross-member is drawn upwards and forwards along the cantrails by rotation of the shaft or spindle, bringing with it the roof covering and the other cross-members until it reaches its forward position where it may be secured in any desired manner.

The shaft or spindle may be rotated by hand by means of a crank-handle or key fitting on the end of the shaft which is squared to receive it, or alternatively an electric motor deriving current from the usual lighting and starting batteries is mounted on the front cross-member and drives the shaft through worm or other reduction gearing. Current can be conveyed to the motor through flexible metallic strips running between the cover and lining of the roof and adapted to fold with it.

The motor can be controlled by a reversing switch on the dash or other convenient point, and the driver can alter the character of the body according to weather conditions simply by operation of the switch without leaving his seat or disturbing the passengers.

The side frames which carry the cantrails may conveniently be provided with glass windows sliding over each other or adapted to be lowered into the doors and body, so that the car can be used entirely open, with the side windows in position and the roof open, or with the windows in position and the roof closed as in an ordinary saloon.

One practical form of my invention as applied to a private car body is illustrated as an example in the accompanying drawings in which:—

Figure 1 is a side elevation of the body closed.

Figure 2 is a similar view in part section showing the body open.

Figure 3 is a rear elevation with the body open.

Figure 4 is a detail section showing one method of making the running connection of the cross-members of the roof to the cantrails.

In the form illustrated, my invention is applied to a three or four-door private car.

On each side the cantrail $a$ extends from the wind-screen pillars $b$ towards the rear end of the body where it is downwardly curved to meet the back of the body which projects behind the cantrail, but is slightly lower than the belt-molding $c$, for the reason set forth below. The flexible roof covering $d$ is carried by cross-members $e$ running on the cantrails and by a rear transverse member $f$ carried by cranked arms $g$ pivoted inside the body on the rear uprights of the superstructure.

The cantrails are supported by the wind-screen pillars $b$, uprights $h$ between the doors, and uprights $j$ behind the rear doors, and the rear ends of the cantrails are carried down into the body where they are braced to the main body members. In the body illustrated sliding glass panels are shown closing the sides of the body, but panels sliding into the doors and body sides may be provided so that the body above the belt line may, at will, be unenclosed except for the uprights and cantrails.

For the connection of the roof cross-members to the cantrails, a continuous rib $k$ of circular cross-section is formed or secured on the inner face of the cantrail, and two pairs of concave rollers $l$, carried by the cross-member are adapted to run on the upper and lower faces of the rib. As shown in Figure 4, the rib is formed by half-round strips rivetted on opposite sides of an angle strip secured to the cantrails, but the rib and the angle strip may if desired be formed together from rolled or extruded metal.

The rollers are mounted on pins passing through the inwardly cranked ends of a steel or other U shaped spring $m$ of which one limb is secured to the underside of the cross-member. This construction permits slight relative movement of the rollers to prevent binding on the curved parts of the cantrails and also ensures a good fit of the rollers on the rib to prevent noise. Excessive separation of the rollers is prevented by enclosing the spring in a sheet-metal box $n$ which also conceals the spring and rollers and gives a neat finish.

A continuous groove $o$ is formed in the upper surface of the cantrail to receive the rack which in this illustrated embodiment is formed by a chain $p$ secured in place at intervals by pins $p'$ but which can readily be formed from slotted strip metal. The toothed wheels $q$ which mesh with the racks are recessed into the front cross-member and are carried near opposite ends of a shaft $r$ passing through the cross-member and supported in suitable bearings.

Both ends of the shaft are squared to receive a crank handle or key $s$ so that the shaft can be operated from either side of the vehicle.

Figure 5:
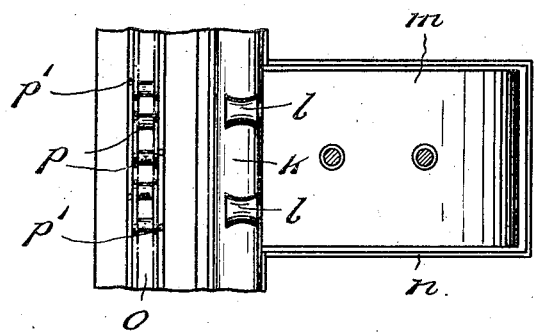
Figure 5 is a section on the line 5—5 of Figure 4, showing a fragment of the rack in the cantrails.
Figure 6:
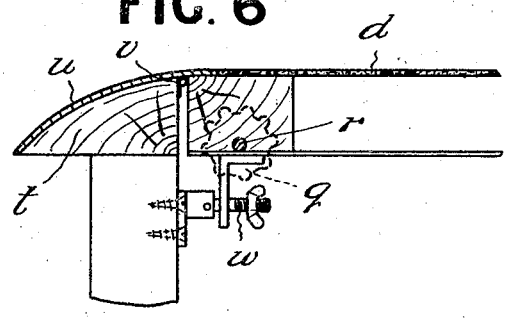
Figure 6 is a detail section showing one method of securing the front cross-member in the closed position.
Figure 7:
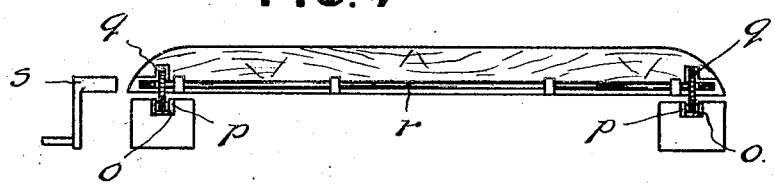
Figure 7 is a transverse section of the roof on a smaller scale showing the operating shaft and toothed wheels engaging the racks.

When the body is closed the front cross-member abuts against a transverse member $t$ carried by the screen pillars as shown in Figure 6, and a weathertight joint is made by a sheet metal covering $u$ on the member $t$ which overlaps the cross-member and by a draught excluding strip $v$ of rubber, felt, or any other suitable material, between the abutting faces of the members. Screw-threaded draw-bolts $w$ pivoted on the wind-screen pillars are adapted to be swung up into slots in lugs depending from the cross-member, and wing-nuts on the bolts permit the cross-member to be drawn tightly against the member $t$. Instead of draw-bolts, any equivalent devices such as cams may be employed. In case the roof covering should stretch, the member $t$ may be mounted on slides so that it can be moved forward to allow the front cross-member to be drawn farther up, but this is not essential.

In the open position of the body as shown in Figure 2, the rear supporting member $f$ of the roof covering which is carried by the arms $g$ folds down against the back of the body. The reduction in height of the body at the back permits the arms $g$ to lie horizontally inside the sides of the body, and the outer ends of the arms rest on buffers at the upper ends of guard strips $x$ secured to the rear panel. The other cross-members $e$ lie vertically above the arms and the fabric or other covering hangs down in folds into a recess behind the back cushion $y$ which is temporarily swung forward to allow the folds to fall into place. If desired a hood cover can be provided by attaching material to the back of the rear cushion and bringing it over the folded hood and attaching it by turn-buttons or the like mounted on the back of the body.

To close the body the operating key is fitted to one end of the shaft $r$ which is rotated, and the toothed wheels thereon engaging with the racks $p$ cause the front cross-member to travel forwardly on the cantrails, bringing after it the cover and the other cross-members until the front member reaches its forward position where it is secured as described above.

The roof is preferably provided with a lining of fabric or other suitable material secured to the underside of the cross-members in addition to the outer covering, and to equalize the strain on the covering when the cross-members are travelling round the curved parts of the cantrails the cross-members may be connected by strips of elastic webbing or by springs.

Where the vehicle body is of considerable width in an omnibus or char-a-bancs, a free-running shaft with pinions engaging the racks on the cantrails may be provided on each cross-member to prevent the cross-members getting out of line and to keep them always at right angles to the cantrails, but this is not essential.

An additional refinement which may be provided is the fitting of sheet-metal strips on the outer faces of the rear parts of the cantrails to deflect wind and rain, the strips overlapping the edges of the roof covering when it is in the closed position as shewn in Figure 1.

I claim:—

1. A vehicle top comprising fixed longitudinal cantrails, downwardly curved at their rear ends to meet the vehicle body, means for supporting the cantrails from the body, a continuous inwardly projecting rib on each cantrail, a flexible roof covering, cross-members supporting said covering, a spring of curved outline on each end of said cross-members, rollers rotatably mounted on the limbs of said springs and engaging above and below said ribs on the cantrails, casings enclosing said springs and rollers, and co-operating gearing on the front cross-member and cantrails for causing the cross-members to travel along the cantrails.

2. A vehicle top comprising fixed longitudinal cantrails, downwardly curved at their rear ends to meet the vehicle body, means for supporting the cantrails from the body, a continuous inwardly projecting rib on each cantrail, a flexible roof covering, cross-members supporting said covering, a spring of curved outline on each end of said cross-members, rollers rotatably mounted on the limbs of said springs and engaging above and below said ribs on the cantrails, casings enclosing said springs and rollers, a rotatable transverse spindle on the front cross-member, toothed wheels on the spindle, and racks on the cantrails with which the toothed wheels mesh for causing the cross-members to travel along the cantrails.

3. A vehicle top including fixed, parallel, longitudinal cantrails, a flexible roof cover, fixed parallel correspondingly toothed racks on the cantrails, cross members, secured at spaced intervals to the flexible covering, and movable along the cantrails during extension and collapse of the flexible cover, means for retaining the cross pieces in traveling relation upon the cantrails, propelling means embodying a transverse rotatable spindle carried by one of the said cross members, and provided with a pair of correspondingly toothed pinions fixed thereon and meshing respectively with said racks to govern the movement of the cross-member along the cantrails in a right angled relation thereto during the whole length of its travel, whereby the propelling means, cross pieces and cover may be entirely retracted from above the vehicle's top.

4. The combination in a vehicle top of a pair of fixed, longitudinal, parallel top carrying elements, means for supporting said elements above the vehicle body, cross members traveling on the carrying means, propelling means carried by one of the cross members, and a pair of fixed means parallelling the carrying means and engaged by the propelling means to move both ends of the cross member uniformly in either direction along the carrying means, and a flexible roof cover attached at spaced intervals to the cross members, whereby the cover, cross members and carrying means may all be retracted from above the top of the vehicle leaving the same entirely unobstructed by either of them, or may be optionally drawn forward to cover the top of the vehicle.

In testimony whereof I affix my signature.

ALFRED HOPE ALEXANDER.